United States Patent [19]

Gunderson

[11] 4,316,655

[45] Feb. 23, 1982

[54] ADJUSTABLE AUTOMATIC SURVEILLANCE CAMERA

[75] Inventor: Norman R. Gunderson, Pasadena, Calif.

[73] Assignee: American Electronics, Inc., Fullerton, Calif.

[21] Appl. No.: 131,099

[22] Filed: Mar. 18, 1980

[51] Int. Cl.³ .............................................. G03B 1/00
[52] U.S. Cl. .................................... 352/166; 242/206; 352/191
[58] Field of Search ....................... 352/166, 191, 192; 242/206, 207, 208; 354/94, 99

[56] References Cited

U.S. PATENT DOCUMENTS 3,677,486 7/1972 Findlay ................................ 242/206
3,963,334 6/1976 Shimazaki ............................ 352/191

Primary Examiner—Monroe H. Hayes
Attorney, Agent, or Firm—Charles E. Wills

[57] ABSTRACT

A camera in which a strip of film is progressively advanced from a feed roll to an exposed film roll and past an exposure location, and including a mechanism for intermittently turning an exposed film spool to successively advance different frames of the film to the exposure location, and a sensing element which is responsive to a change in diameter of one of the rolls of film to cause automatic adjustment of the spool turning mechanism in a manner changing the angle through which the exposed film spool is turned on each film advancing operation of the mechanism in accordance with changes in diameter of the film rolls to thereby compensate for that change in diameter and render the linear advancement of the film on successive operations of the mechanism more uniform than it would otherwise be. The shutter of the camera is preferably formed of two shutter parts having conically extending portions containing light-passing interruptions and mounted for relative rotary adjustment to vary the effective combined circular extent of those interruptions. The film rolls may be contained within a film cartridge case, which also contains an element responsive to changes in diameter of one of the rolls and acting to control an indicator carried by the film body at the outside of the cartridge case to indicate the amount of film which has been used or remains. A variable speed transmission controls the rate of operation of the shutter and other moving parts by a driving motor, and includes two sets of gears of different sizes carried by spaced shafts, and a carrier mounted to turn about one of those shafts and having a series of circularly spaced gears movable in different positions to complete a drive connection between different pairs of the gears of the two sets.

12 Claims, 20 Drawing Figures

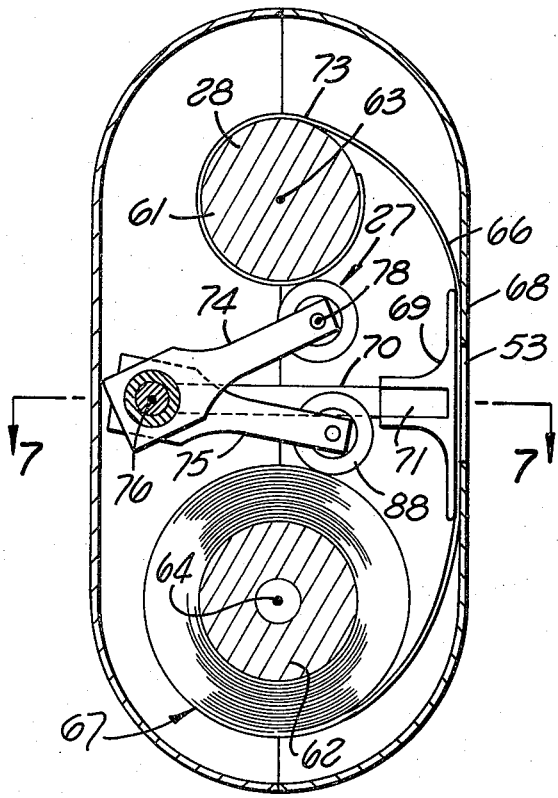
FIG. 6
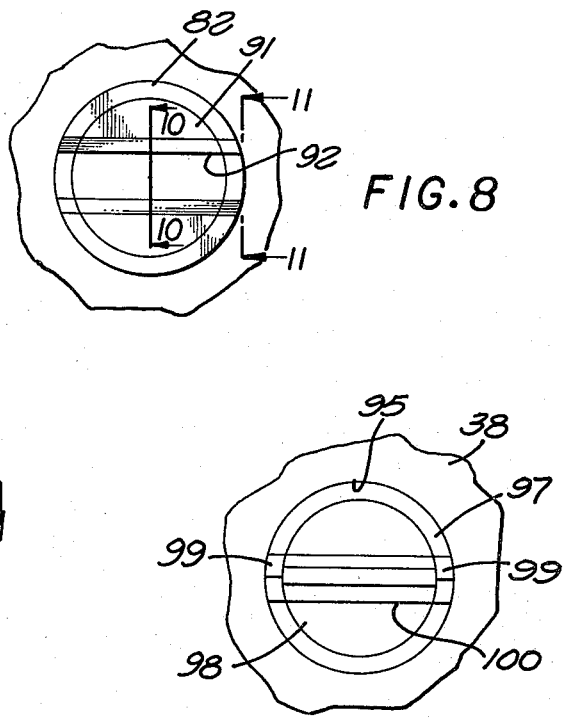
FIG. 8
FIG. 9
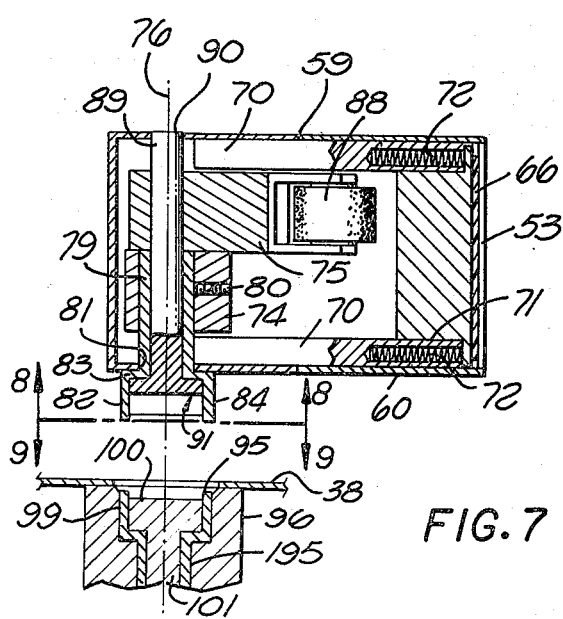
FIG. 7
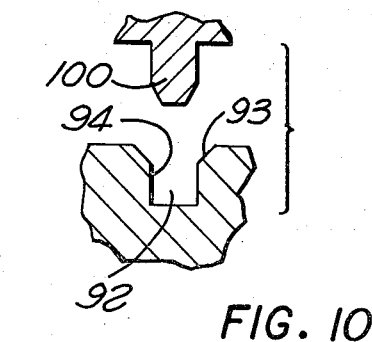
FIG. 10
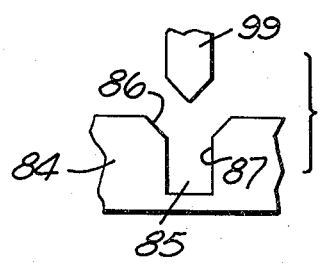
FIG. 11

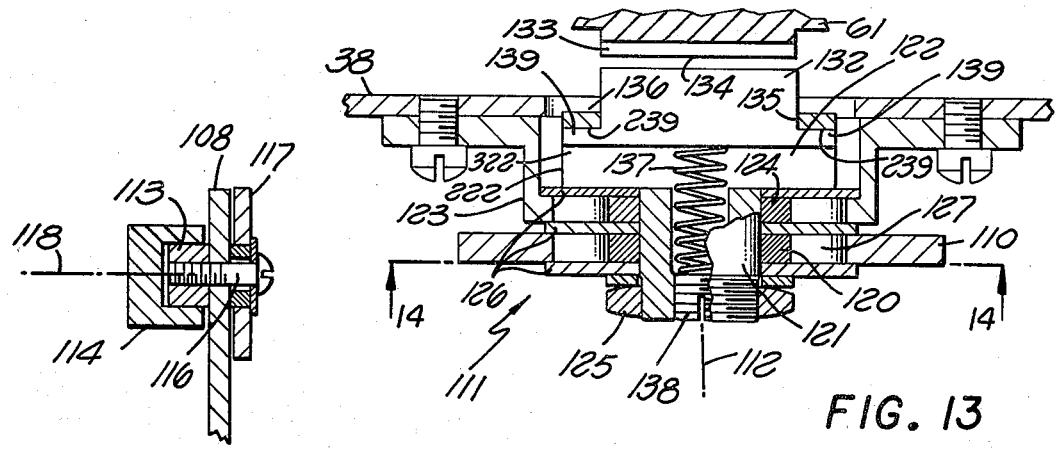
FIG. 12    FIG. 13
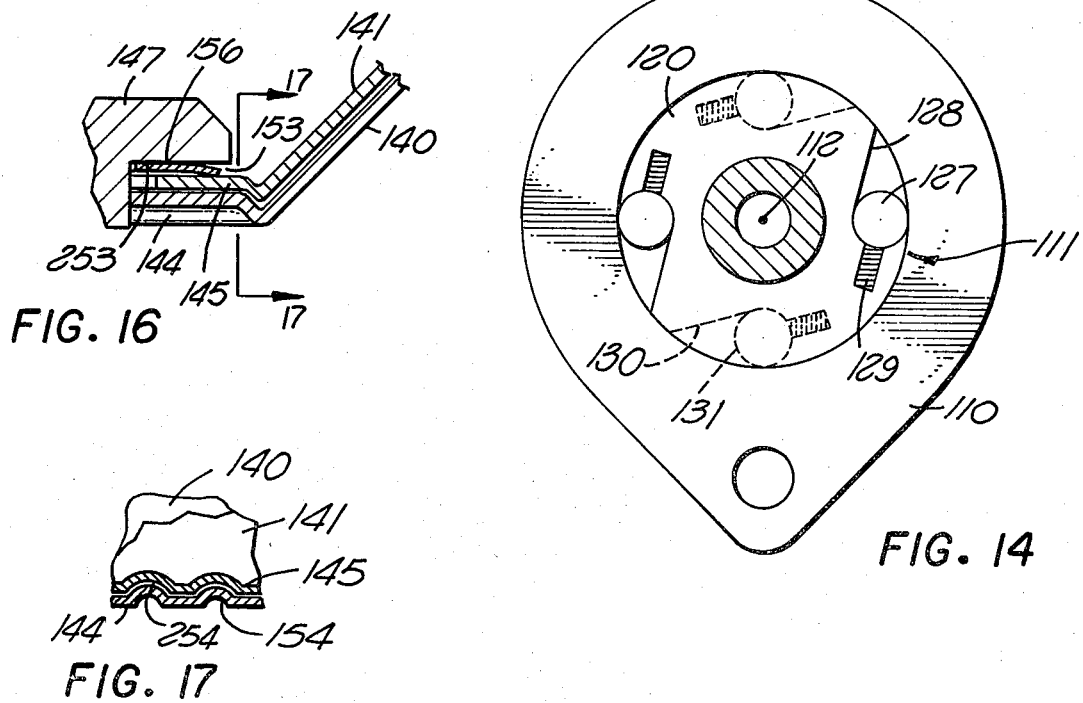
FIG. 16
FIG. 14
FIG. 17
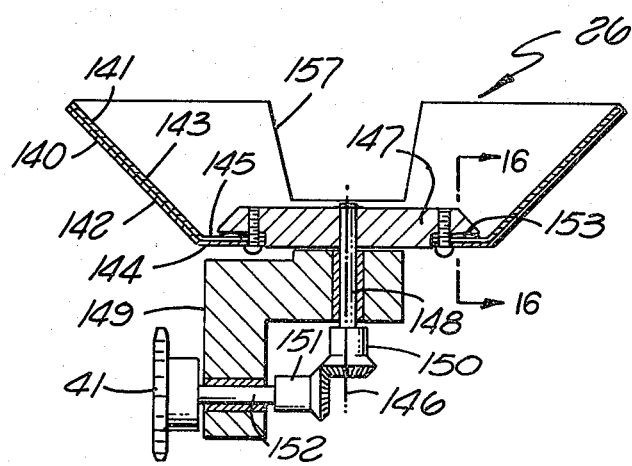
FIG. 15

ADJUSTABLE AUTOMATIC SURVEILLANCE CAMERA

BACKGROUND OF THE INVENTION

This invention relates to improved cameras which in certain respects are especially designed for use as surveillance cameras to record photographically occurrences at a particular location in a bank, store, office, or other establishment.

The camera of the present invention is of a known type in which the film is in roll form, preferably within a cartridge case easily insertable into or removable from the body of the camera, with the film advancing progressively from a supply roll to an exposed film roll and past an exposure location at which successive frames are exposed through a lens by a shutter. When a camera of this type is in operation, the shutter and film advancing mechanism are driven by motor means, to intermittently advance the film and expose it through the shutter in timed relation to the advancement. The mechanism for advancing the film may be so constructed and located that movement of the film cartridge into position in the camera or body automatically connects the film advancing mechanism to the film within the cartridge in driving relation.

SUMMARY OF THE INVENTION

A major feature of the present invention resides in the provision of a unique arrangement for controlling the extent of linear advancement of the strip of film on each cycle of operation of the camera, so that the centers of successive frames are spaced apart a common predeterminable distance to assure optimum use of the film without either overlapping of successive frames or excessive unexposed film areas between those frames. This control of the distance that the film advances from one frame to the next is attained without the use of a timing sprocket wheel or other similar timing element actually measuring the linear movement of the film, and is accomplished with an extremely simple mechanism of low cost and at the same time inherent operational reliability. In a camera embodying the invention, the film advancing mechanism is of a character enabling its adjustment to controllably vary the angle through which the exposed film spool is turned on each operation, and that mechanism is controlled by an element which senses the diameter of one of the two rolls of film to compensate for changes in the diameter at which the film is wound onto the intermittently driven spool and thereby attain a desired linear advancement of the film on each operation. The sensing element for responding to changes in the diameter of one of the rolls is desirably located within the film cartridge case, and the mechanism for driving the exposed film spool is desirably carried by the camera body at the outside of the cartridge case, with the element and mechanism being brought into coacting relation by insertion of the cartridge case into the camera body. The sensing element may be a swinging arm carrying a roller or other structure engaging the periphery of one of the rolls of film, desirably the exposed film roll, and acting through a shaft to adjust the film advancing mechanism.

The adjustment of the film advancing mechanism is preferably attained by use of apparatus which automatically varies the radial distance between the center of a rotatably oscillating element and a location at which a drive part acts against that element. The drive part may be a reciprocating connector link driven by a rotating crank, with the radial adjustment of the connection between this part and the oscillating element being made by providing the latter with a guideway along which a portion of the drive part is slidable radially of the oscillating element. The rotary oscillation of that element may then function through a one-way clutch to intermittently advance the spool rotatably in accordance with movement of the oscillating element, with the angular extent of the advancement of the spool being regulated automatically by the sensing element responsive to the diameter of the film roll as discussed.

To indicate the amount of film which has been used or remains in the cartridge, there may be provided in the cartridge a sensing element responsive to the diameter of one of the rolls of film, preferably the unexposed roll, and acting to swing an arm within the cartridge which in turn actuates an indicator element at the outside of the cartridge, that indicator element preferably being a swinging arm which is exposed to view and indicates by its positioning the amount of film which has been used or remains in the camera.

Additional features of the invention relate to the preferred construction of the shutter mechanism of the camera in a manner enabling extremely simple but positive adjustment of the time of exposure of each frame. More particularly, the shutter mechanism preferably includes two similar shutter parts having conically flaring portions containing light-passing apertures and having inner radially extending portions connected together for relative rotation to vary the relative positioning of the light-passing apertures in the conical portions and thereby vary the effective combined circular extent of those apertures. Detent means are provided for releasably retaining the shutter parts in different set positions, preferably including detent shoulders formed on the radially extending portions of the parts and yieldingly urged together in detenting relation by a spring.

In order to allow adjustment of the frequency at which successive photographs are taken by the camera, a variable speed transmission may be interposed between a drive motor and the shutter and film advancing mechanism. This transmission preferably includes two sets of gears of different sizes mounted on spaced shafts, with a third set of gears being mounted rotatably at circularly spaced locations to a carrier which can be turned about one of the shafts to bring different ones of the third set of gears into operative engagement with the first and second sets to controllably alter the transmission ratio of the overall mechanism. The carrier may be detentable in any of those settings, desirably by provision of ratchet shoulders on the carrier engageable by a spring-pressed dog preventing rotation of the carrier in the direction in which it tends to turn when power is transmitted therethrough.

BRIEF DESCRIPTION OF THE DRAWINGS

The above and other features and objects of the invention will be better understood from the following detailed description of the typical embodiment illustrated in the accompanying drawings, in which:

FIG. 6 is a fragmentary vertical section taken on line 6—6 of FIG. 3;

FIG. 7 is a fragmentary horizontal section taken on line 7—7 of FIG. 6;

FIG. 8 is a fragmentary view taken in the vertical plane 8—8 of FIG. 7, and showing the connector elements of the film cartridge detached from their mating parts carried by the film body;

FIG. 9 is a view taken in the vertical plane 9—9 of FIG. 7, and showing the connector parts of the camera body detached from the coacting elements of the film cartridge;

FIGS. 10 and 11 are enlarged fragmentary views taken on lines 10—10 and 11—11 of FIG. 8, and showing the coacting connector parts carried by both the film cartridge and the camera body;

FIG. 12 is an enlarged fragmentary section taken on line 12—12 of FIG. 4;

FIG. 13 is an enlarged fragmentary vertical section taken on line 13—13 of FIG. 3;

FIG. 14 is a fragmentary vertical section taken on line 14—14 of FIG. 13;

FIG. 15 is a fragmentary section taken on line 15—15 of FIG. 1;

FIG. 16 is an enlarged detail view corresponding to a portion of FIG. 15;

FIG. 17 is a fragmentary section taken on line 17—17 of FIG. 16;

DESCRIPTION OF THE PREFERRED EMBODIMENT

Figure 1:
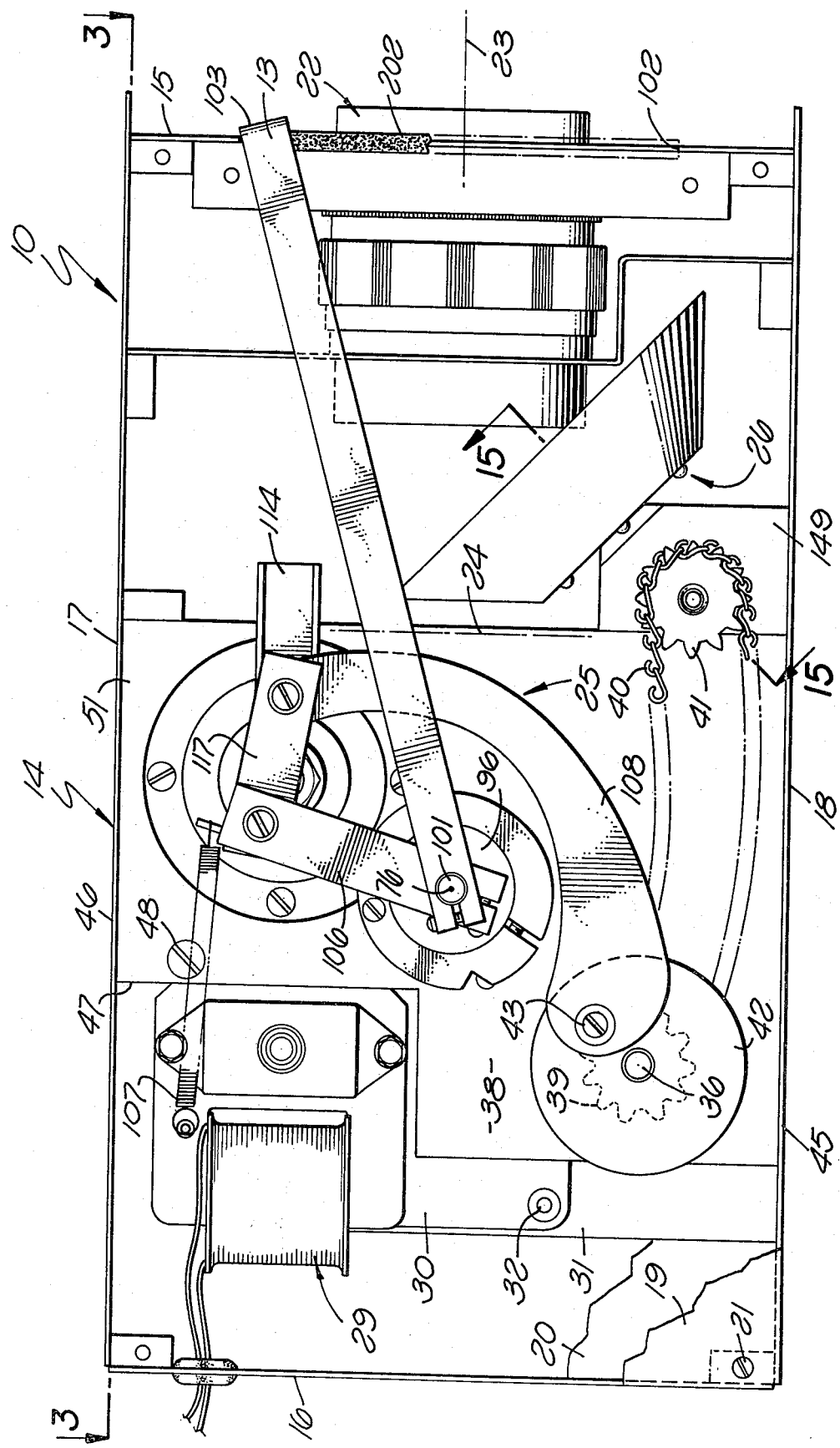
FIG. 1 is a side view of a surveillance camera constructed in accordance with the invention, with the side wall of the camera broken away to reveal the inner working parts.

The camera 10 illustrated in the drawings is typically usable as a surveillance camera which will function when energized electrically to take a series of photographs at a predetermined rate on film contained within a cartridge 11. The rate at which the photographs are taken is determined by setting a control knob 12 to any of a plurality of different positions. The amount of unused film remaining in cartridge 11 at any particular time is indicated visually by the positioning of an indicator arm 13 which can be seen a substantial distance away from the camera.

The working parts of the camera are contained within an outer typically rectangular light-tight housing 14 having front and rear walls 15 and 16, horizontal top and bottom walls 17 and 18, a vertical side wall 19 extending across the entire right side of the housing, a smaller parallel vertical wall 20 closing a rear portion of the left side of the housing, and a door 120 closing the remainder of the left side of the housing. Door 120 may be attached at its lower edge by a hinge 220 to bottom wall 18 to mount the door for downward and outward swinging movement between a closed position of extension vertically at the side of the housing in light-tight relation and an open position providing access to the interior of the housing and to the film compartment for loading. The side walls 19 and 20 may be removably attached to the rectangular structure formed by walls 15 to 18 by screws 21 or other fastening means. A lens 22 having a horizontal axis 23 forms an image in focus on a portion of the film within cartridge 11, with the image lying in the vertical plane represented at 24 in FIG. 1. The lens is of course adjustable in correspondence with the distance of the camera from the area being photographed, to form the desired focused image of that area in plane 24.

The film is intermittently advanced within cartridge 11 by a film advancing mechanism 25, with a shutter mechanism 26 blocking admission of light to the film during its advancement. The angle through which the film is advanced on each cycle of operation is controlled by a sensing element 27 (FIG. 6), which is contained within the film cartridge and senses the amount of film that has been wound on the exposed film spool 28 of the cartridge.

Film advancing mechanism 25 and shutter 26 are driven in predetermined timed relation by an electric motor 29 (FIG. 1), through a speed reduction gear assembly represented at 30. The motor and reduction gear assembly 30 may be mounted to one side of a vertical wall 31, being secured by screws represented at 32 or otherwise, with the horizontal output shaft 33 of the motor extending through wall 31 to its opposite side where it drives a variable speed transmission 34 to be described in greater detail at a later point. The output shaft 36 of variable speed transmission 34 then extends back through vertical wall 31 to the side on which the motor is located, and is journaled in bearings 37 carried in openings in that wall and a second vertical front to rear wall 38 spaced from wall 31. Beyond wall 38, shaft 36 carries a sprocket wheel 39 engaging an endless chain 40 which drives a second sprocket wheel 41 for rotating the shutter 26. Laterally outwardly beyond sprocket wheel 39, shaft 36 carries a disc or wheel 42 carrying a short stub shaft or pin 43 which extends parallel to the axis of rotation 44 of shaft 36 and functions as a crankshaft constituting the driving portion of film advancing mechanism 25.

Figure 3:
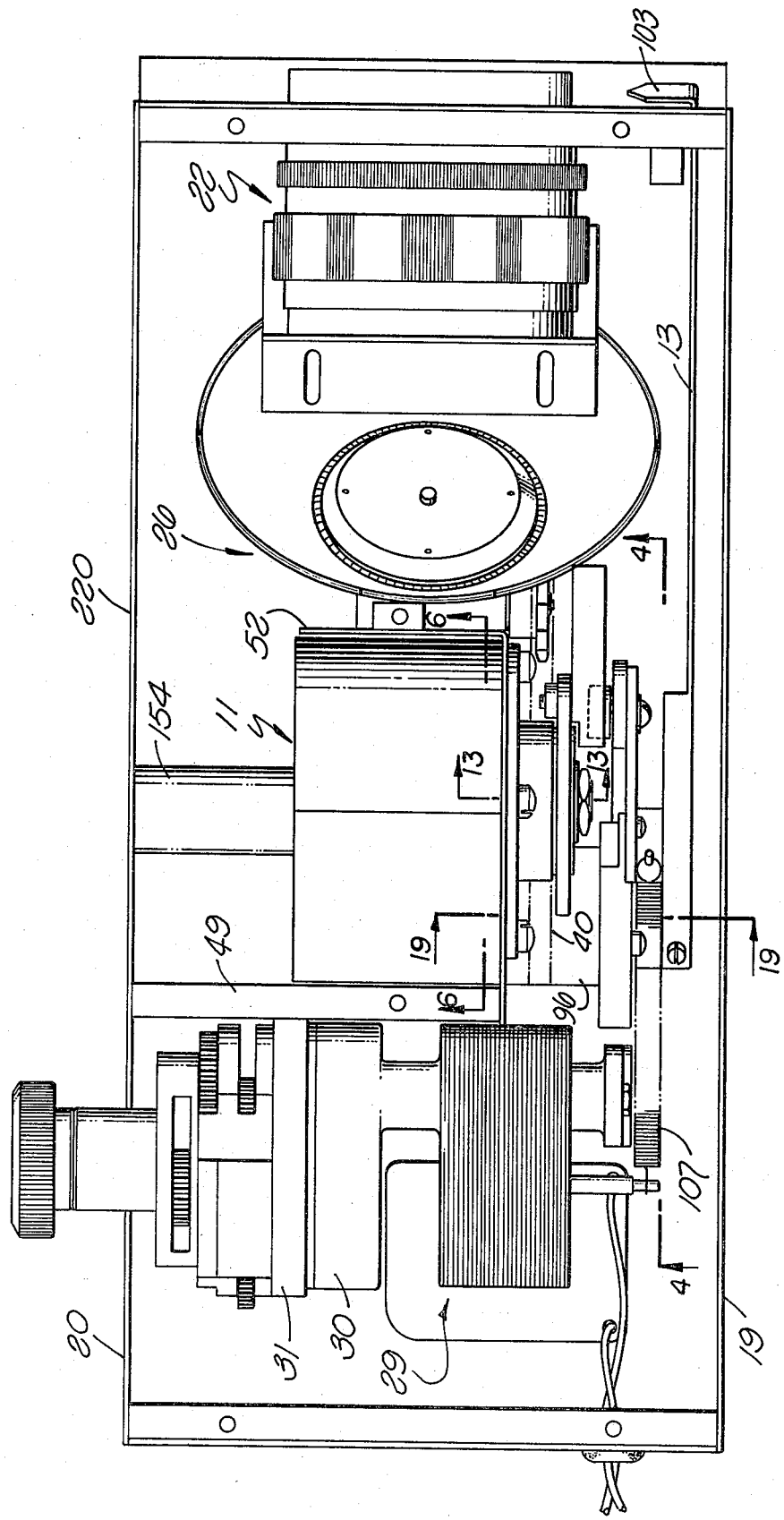
FIG. 3 is a fragmentary horizontal section taken on line 3—3 of FIG. 1.

The rear portion of vertical wall 38 extends from the bottom of motor 29 to bottom wall 18 of the housing. At a location forwardly of the motor, this wall 38 has a greater vertical extent, to extend the entire distance from a lower edge 45 adjacent bottom wall 18 of the housing to an upper edge 46 adjacent the top wall 17. At the juncture of its rear shorter portion and its forward portion of increased vertical dimension, wall 38 has a vertical back edge 47, adjacent which the wall 38 is connected as by screws 48 to a vertical wall 49 disposed transversely of the front to rear axis 23 of the camera. This wall 49 extends the entire vertical distance between top wall 17 and bottom wall 18 of the housing to thus form the back side of a compartment 50 within which film cartridge 11 is received. The right side of this compartment is formed by the forward increased height portion 51 of wall 38. The front of compartment 50 is formed by a vertical wall 52 disposed parallel to wall 49 and perpendicular to axis 23. As seen in FIG. 3, this front wall 52 and side wall 38 of film compartment 50 may be stamped from a single piece of sheet metal or other material bent at right angles at the juncture between these two walls. The film compartment 50 may be of uniform horizontal section and essentially rectangular horizontal configuration through the entire vertical extent of that compartment between top and bottom walls 17 and 18 of the camera housing or body. Front wall 52 has a rectangular opening 53 at the location of the image formed by lens 22 to pass that image to the film within cartridge 11. When side wall 20 is removed from the housing, cartridge 11 may be slid horizontally into or out of compartment 50, being appropriately retained in its illustrated fully inserted position by closure of side door 120, as by provision at the inner side of that door of a projection 154 or other means for bearing laterally against the cartridge and holding it in place.

The film cartridge 11 includes an outer hollow case 54 which may be formed of two similar front and rear halves or sections mating at 55 in a vertical transverse plane 56 and secured together in light-tight relation along that plane by light-sealing black tape 57. The two halves of case 54 define together the vertical outline configuration represented in FIG. 2, and define two parallel vertical opposite side walls 59 and 60 extending parallel to and spaced equal distances from the front to rear axis 23 of the camera. Two vertically spaced film spools 61 and 62 are journaled in the case 54 for rotation about spaced vertical parallel axes 63 and 64 disposed transversely of the camera and cartridge case. These spools are mounted for such rotation by reception within complementary semi-circular recesses 65 formed in the side walls 59 and 60 of the cartridge case and defining together circular openings within which slightly reduced diameter end portions 66 of spools 61 and 62 are received and confined in a manner journaling the spools for rotation while preventing axial movement thereof.

When the cartridge 11 is first placed in a camera, a strip of film 66 is wound about the lower spool 62 of the cartridge case, as a roll 67 of unused film, and has its end extending upwardly along the inner side of a front wall 68 of the case and past exposure opening 53, in front of a spring-pressed backing plate 69, with the upper end of the film being connected to top spool 61. There initially is connected to this top spool only enough of the film to form an effective attachment by which the spool can pull the film upwardly from the bottom spool and wind it on the upper spool. More particularly, there may initially be a single turn of the film wound on the top spool and secured thereto.

The backing plate or pressure plate 69 may be mounted appropriately for limited front to rear movement, as by provision of two parallel horizontal posts 70 (FIG. 7) secured at their rear ends to the rear half of the cartridge case, and projecting forwardly therefrom in spaced relation. Forward ends of these posts are slidably received within a pair of guide grooves 71 formed in the back side of the plate 69, with coil springs 72 contained within recesses in the front ends of the posts 70 and bearing forwardly against plate 69 to yieldingly urge it forwardly against the film in a manner holding the film in tight engagement with the back side of wall 68 of the cartridge case and engaging wall 68 continuously about opening 53 except at the location of the film in a manner forming an effective light-tight seal about opening 53 preventing admission of any light into the interior of the cartridge case while permitting exposure of a single frame of the film at opening 53.

For sensing and responding to the amount of film which is present in bottom roll 67 and top roll 73, there are provided within cartridge case 54 two arms 74 and 75 mounted to swing about a common axis 76 parallel to the axes of the two spools 61 and 62. Arm 74 carries the previously mentioned sensing element 27, which is preferably a roller mounted by a bifurcated end portion of arm 74 to turn about an axis 78 relative to the arm. This roller desirably has an outer portion formed of rubber or other deformable material which will not harm the film, and having an outer cylindrical surface contacting and rolling along the film as the roll of film turns. As seen in FIG. 7, arm 74 has a mounting portion received about a tubular shaft 79, being secured rigidly thereto by a screw 80, with the externally cylindrical tubular shaft 79 extending laterally through a circular side opening 81 in a side wall of the rear portion of the cartridge and having a connector portion 82 at the outer side of the wall for attachment to the film advancing mechanism. This connector portion is of cup-shaped configuration, having a transverse wall 83 and a cylindrical wall 84 centered about the axis of pivotal movement 76 of shaft 79. At two diametrically opposite locations, the side wall 84 of connector portion 82 has two similar notches 85 having the configuration illustrated in FIG. 11, with tapering or converging side wall portions 86 and parallel side wall portions 87.

The second swinging arm 75 within the film cartridge case may be essentially the same as the described arm 74, carrying within its bifurcated end portion a rubber roller 88 having an outer cylindrical surface contacting the periphery of the lower roll 67 of film to measure its diameter. The mounting end of arm 75 is connected to a shaft 89 (FIG. 7), which is journaled within the previously mentioned tubular shaft 79 and is journaled at its extremity within an opening 90 formed in a side wall of the cartridge case. Shaft 89 extends outwardly through the right side wall of the cartridge case and carries a connector head or portion 91 contained within the cup-shape connector portion 82 of shaft 79. This connector portion 91 may be externally cylindrical and a close fit within the cylindrical side wall of portion 82, and has a transverse axially facing recess or slot 92 formed therein and having the configuration represented in FIG. 10. This recess is defined by outer converging side wall surfaces 93 and inner parallel side wall surfaces 94.

Figure 2:
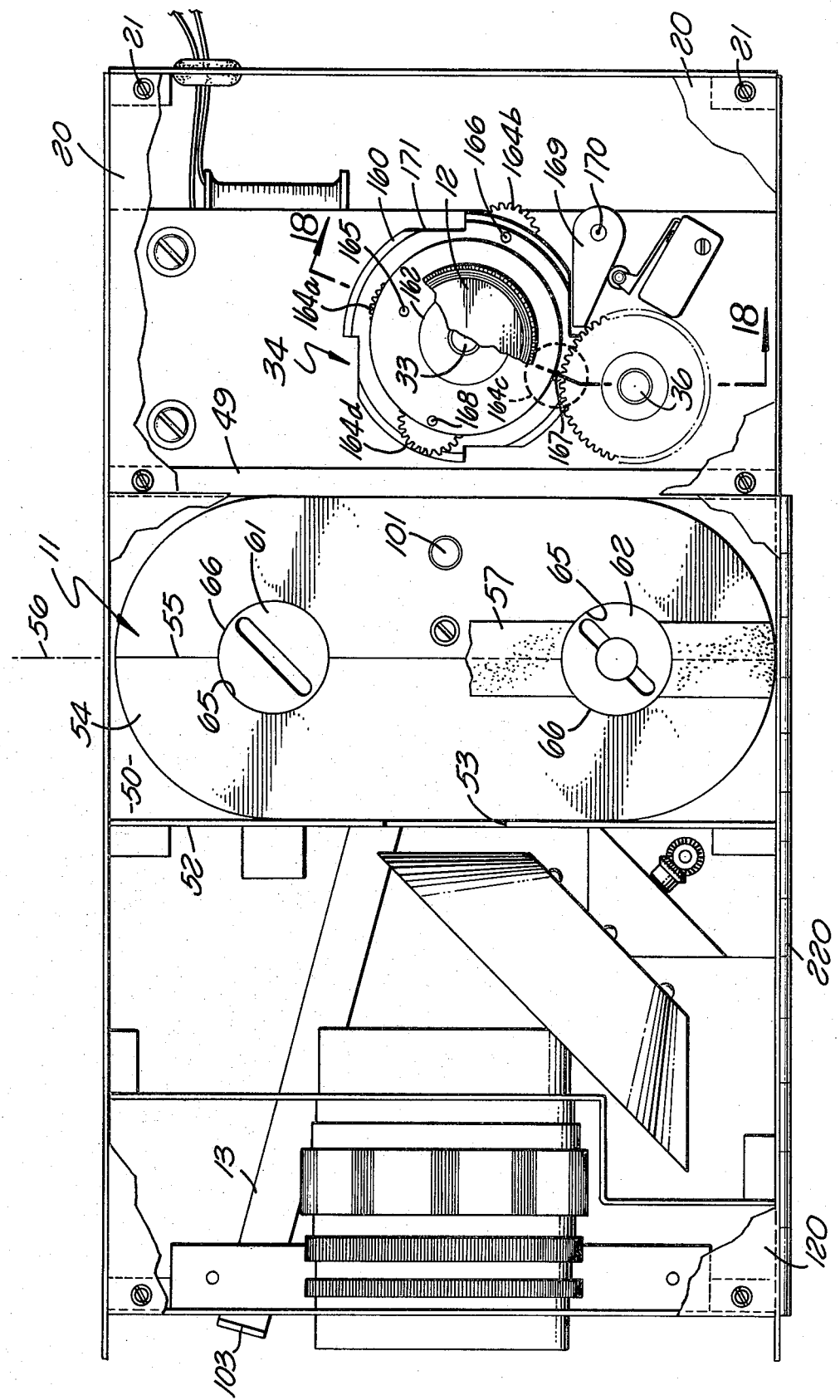
FIG. 2 is a side view taken from the opposite side of the camera, again with the side wall broken away.

When the cartridge is received in its FIGS. 1 to 3 position of use in the camera body, the right-hand side wall of the cartridge case abuts against the previously mentioned vertical front to rear wall 38 of the compartment within which the cartridge is received, with the connector portions 82 and 91 projecting laterally through a circular opening 95 in wall 38. At the opposite side of wall 38, there is rigidly secured to that wall a tubular bushing or bearing element 96 within which two connector parts 97 and 98 coacting with connectors 82 and 91 are mounted for rotation about axis 76. The connector 97 has two diametrically opposite axially projecting drive lugs 99 having the configuration represented in FIG. 11 and adapted for reception in rotary driving relation within notches 85 of part 82. Similarly, the inner connector portion 98 has a diametrically extending axially projecting tongue having the configuration illustrated in FIG. 10 and receivable in rotary driving relation within recess 92. As will be understood, the interfitting connectors of the cartridge case and camera body act when the cartridge case is in position in the camera body to turn connectors 97 and 98 about axis 76 in correspondence with swinging movement of the arms 74 and 75.

The connector 98 has a shaft portion 101 which is connected at its outer end to the previously mentioned film indicator arm 13, to cause upward and downward swinging movement of that arm about axis 76 and within a forwardly opening vertically extending slot 102 formed in the front wall of the camera case. Appropriate light-sealing material represented at 202 may be provided in slot 102, to close off the slot against admission of light while permitting the arm 13 to project through and be movable within the slot. Just forwardly of slot 102, the arm 13 may have a laterally turned pointer portion 103 which is readily visible a substantial distance from the camera to enable a person to determine how much film remains in the camera. The weight of arm 13 and the weight of arm 74 within the cartridge case cause roller 88 to continuously bear downwardly against the upper surface of the unused film roll 67. When a full roll of film is present in the lower portion of the camera case, pointer 13 has its extremity near the upper end of slot 102. As the amount of film on the lower roll in the cartridge case decreases, the roller moves downwardly and enables pointer arm 13 to move downwardly, ultimately to a location near the lower end of slot 102 when all of the film has been unwound from lower spool 62.

Figure 4:
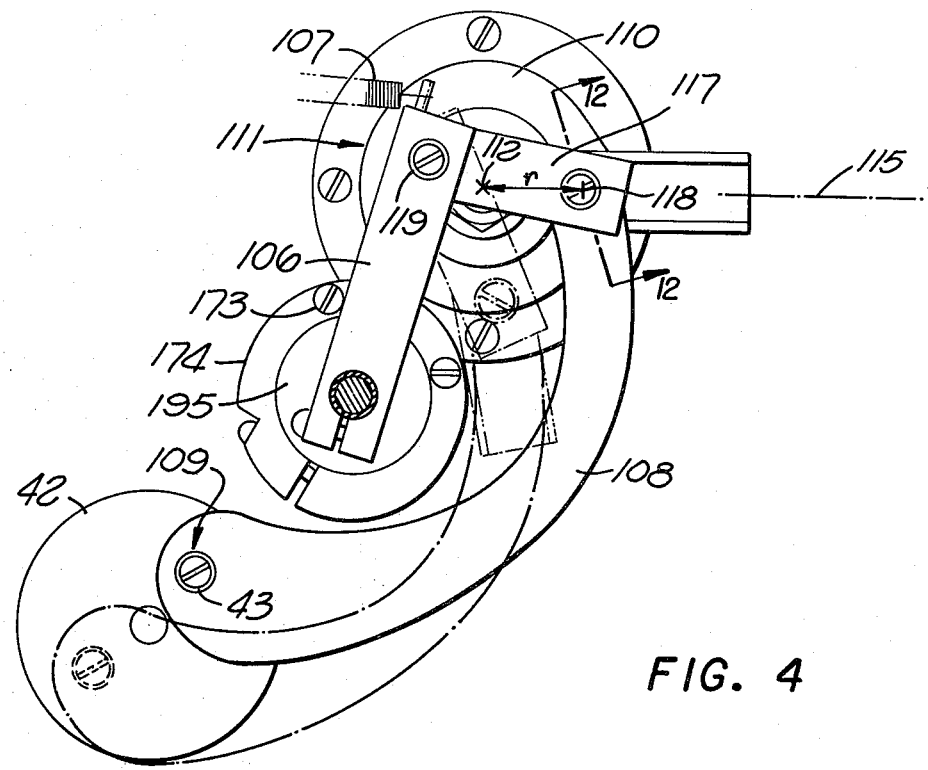
FIG. 4 is an enlarged fragmentary vertical section taken on line 4—4 of FIG. 3, and showing the film advancing mechanism as it appears when a cartridge of fresh film has just been inserted into the camera body.
Figure 5:
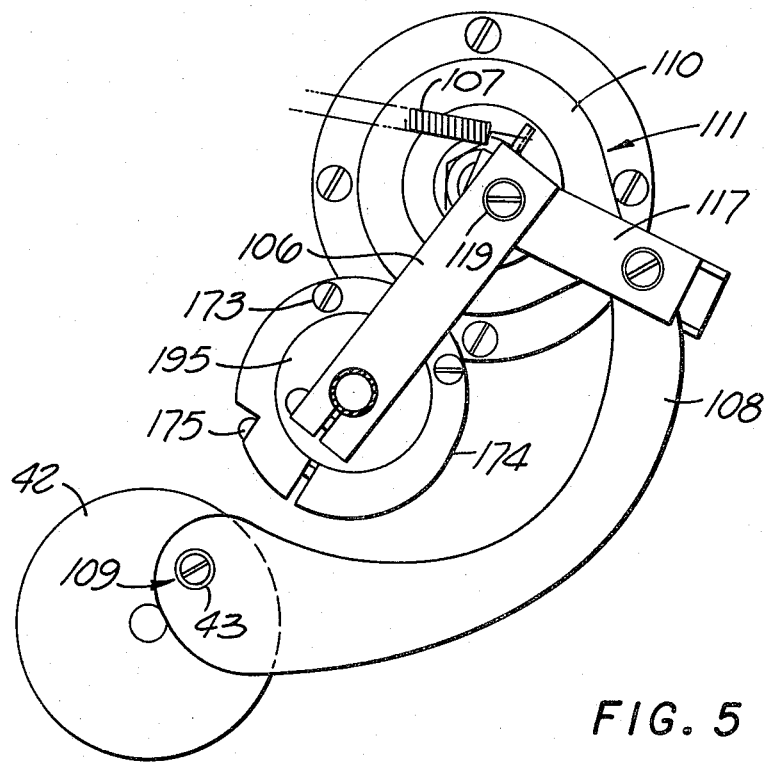
FIG. 5 is a view similar to FIG. 4, but showing the film advancing mechanism as it appears after part of the film has been used.

Connector 97 of FIG. 7 has a tubular portion 104 projecting beyond the end of bearing element 195 and to which a swinging arm 106 is rigidly secured to swing about axis 76 in correspondence with swinging movement of arm 74 within the cartridge case. A coil spring 107, maintained under tension and secured at its opposite ends to arm 106 and the frame of motor 29, yieldingly urges arm 106 and the connected parts in a counter-clockwise direction as viewed in FIGS. 1, 4 and 5, to urge arm 74 and the carried roller upwardly against the top roll 73 of film in the cartridge case. When there is on top spool 61 only enough film to effectively attach the film to that spool, arm 106 is in the position of FIG. 4. As the amount of film on the upper exposed film roll increases, arm 106 swings to the right, as to the FIG. 5 position, and ultimately beyond the FIG. 5 position until all the film is on the top roll. This swinging movement of arm 106 acts in a manner to be discussed at a later point to regulate the amount of rotary advancement of the top spool on each cycle of operation of the camera.

The film advancing mechanism for turning upper spool 61 includes a connecting link or element 108 which moves in an essentially reciprocating manner, and which is driven by pivotal connection at 109 to the previously mentioned crank pin 43 on wheel 42. The opposite end of connecting link 108 acts to rotatively oscillate a disc 110 which functions as the power input element of a one-way clutch 111 for turning upper spool 28 intermittently. Disc 110 turns about an axis 112 and is actuated by connecting element 108 through a roller 113 rotatably attached to the end of element 108 and slidably received and confined within a channel-shaped guideway 114 secured rigidly to disc 110. The longitudinal axis 115 of channel 114 extends directly radially with respect to rotary axis 112 of disc 110, so that the roller 113 is guided by the channel to move relative to disc 110 only radially thereof, that is, only along axis 115. The roller 113 is mounted to the end of connecting element 108 by a pivot pin 116, which also pivotally connects a link 117 to part 108 and the roller for relative pivotal movement about an axis 118. The opposite end of link 117 is connected to arm 106 pivotally at 119. As a result, the previously discussed swinging movement of arm 106 from the FIG. 4 position to and beyond the FIG. 5 position causes corresponding movement of roller 113 along axis 115 and within guideway 114 relative to disc 110, to change the radial distance between roller 113 and axis 112. This change in the radius at which roller 113 acts against disc 110 through channel 114 thus alters the angular extent through which disc 110 is turned upon each reciprocation of connecting element 108.

The one-way clutch 111 may be of the construction illustrated in FIGS. 13 and 14, in which the outer disc or ring 110 is mounted rotatably about an inner disc 120, which is rigidly carried on a reduced diameter portion 121 of a driven part 122. An annular part 123 is located axially inwardly of part 110, and is rigidly secured in fixed non-rotating position by attachment to wall 38 in the camera body. Within part 123, another inner disc or ring 124 is contained, with this part 124 also being rigidly secured to the reduced diameter portion 121 of part 122. The rigid interconnection of parts 120, 122 and 124 may be effected by tightening a nut 125 threadedly onto the end of portion 121 of part 122, and clamping between this nut and an enlarged externally cylindrical head 222 of part 122 the elements 120, 124, and three washers 126. Parts 120 and 123 are slightly thinner axially than parts 120 and 124, so that the inner assembly 120, 121, 124 and 126 may turn within and relative to parts 110 and 120, but with these parts 110 and 120 being effectively located axially.

In order to transmit rotation in one direction (counterclockwise in FIGS. 4 and 14) from part 110 to part 120, a pair of short cylindrical discs or rollers 127 are contained within notches 128 in the periphery of part 120, with those notches being of the camming configuration illustrated in FIG. 14, and with the elements 127 being urged by springs 129 to positions in which they are wedged tightly between the parts 110 and 120 to transmit counter-clockwise rotary motion from part 110 to part 120, while being retractable against the force of the springs to permit clockwise rotation of part 110. As seen in broken lines in FIG. 14, the part 124 contains notches 130 similar to the notches 128 but reversed to become shallower as they extend in the opposite circular direction, with spring-pressed cylindrical wedge elements 131 contained in the notches in a relation preventing clockwise rotation of parts 124 and 122 when part 110 moves in a clockwise direction.

The intermittent rotation of part 122 in a counterclockwise direction is transmitted to spool 61 in the cartridge case by reception of a diametrically extending screwdriver-like 'spade' or lug 132 in a diametrical drive groove 133 formed in the transverse end face 134 of spool 61. Part 132 may be contained within a recess 322 in the externally cylindrical enlarged portion 222 of part 122, and project through an end slot 135 in that part, and be spring-pressed outwardly past transverse end face 136 of part 122 by a spring 137 retained by a plug 138. The movement of part 135 may be limited in the FIG. 13 position by engagement of two end portions 139 of part 132 with a pair of shoulders 239 formed in the outer end of part 122. As will be understood, when a film cartridge is first moved into position within the camera body, part 132 may be retracted against the tendency of its spring 137 by engagement with spool 61, if the element 132 is not in proper alignment with slot 133, but as soon as element 122 has been turned through an appropriate angle the parts will align and engage in driving relation.

Referring now to FIGS. 15 and 16, the shutter 26 includes two similar shutter elements 140 and 141, having adjacent conically flaring portions 142 and 143 and adjacent inner radially extending portions 144 and 145 disposed transversely of the axis of rotation 146 of the shutter. The inner portion 144 of element 140 is secured rigidly to a drive member 147 which is attached to a shaft 148 journaled for rotation within a mounting block 149 secured stationarily to the housing of the camera. Shaft 148 carries a bevel gear 150 meshing with a bevel gear 151 attached to a shaft 152 secured to sprocket wheel 41 driven by the motor through chain 40. The second shutter element 141 is rotatably adjustable relative to element 140, being mounted for such adjustment by reception and confinement of the radially extending inner portion 145 of part 141 within an annular groove 153 in part 147. More particularly, portion 145 is confined between a radially extending shoulder 253 formed by part 147 and the radially extending portion 144 of part 140. A series of radially extending axially projecting detenting ridges or ribs 154 are formed on portion 144 of part 140, entirely about the annular extent of portion 144, and a similar series of radially extending grooves 254 are formed on portion 145 of part 141, at locations to receive the ribs 154 in any of a number of different relative circular settings of the shutter parts. A circular spring 156 is received axially between shoulder 253 and the inner portion 145 of part 141, to urge portion 145 of part 141 axially against portion 144 of part 140, thereby urging the projections of portion 144 into the grooves of portion 145 and effectively detenting the shutter part 141 in any desired setting relative to part 140. The conical portions 142 and 143 of parts 140 and 141 contain interruptions or slots 157, which in one rotary setting of the parts register exactly with one another to form together a gap of a predetermined circular extent, and which can move to different positions of decreasing registry to reduce the effective circular extent of the light-passing interruption formed together by the two gaps. Thus, the amount of light admitted to the film on each revolution of the shutter can be controlled by varying the relative rotary setting of parts 140 and 141.

Figure 18:
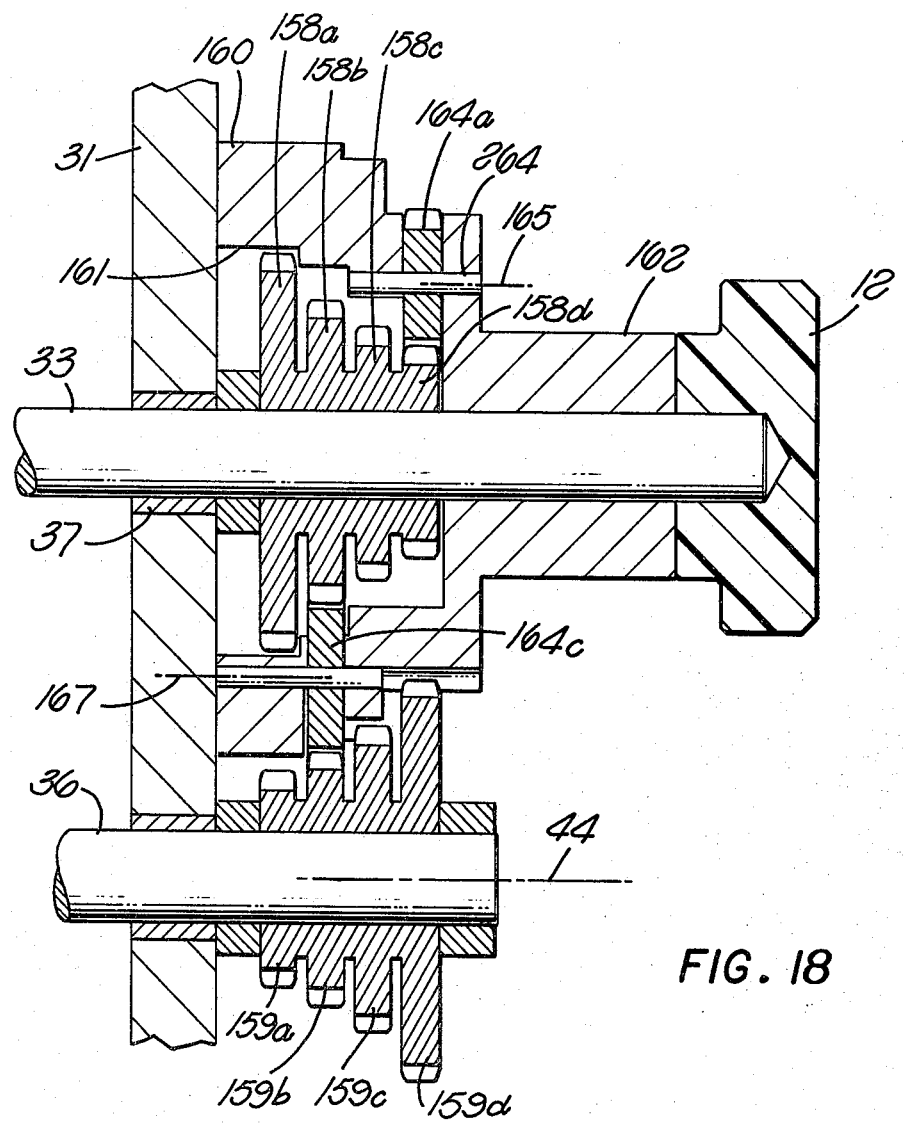
FIG. 18 is an enlarged section through the variable speed transmission taken on line 18—18 of FIG. 2.
Figure 20:
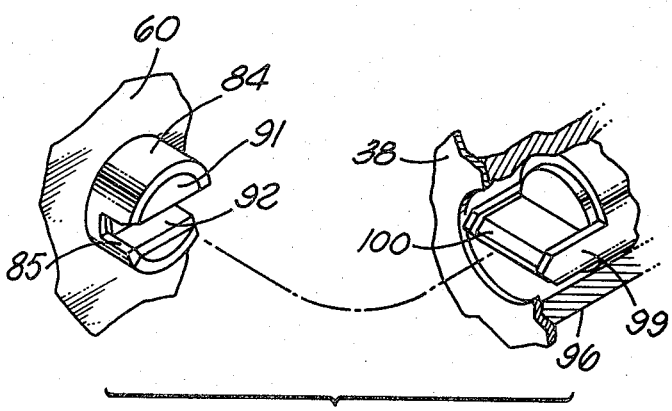
FIG. 20 is a fragmentary exploded perspective representation of the connector elements on the film magazine and camera which move into interfitting engagement when the magazine is inserted into the camera.
Figure 19:
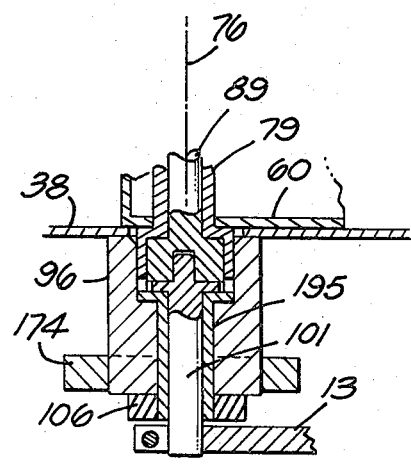
FIG. 19 is a fragmentary vertical section taken on line 19—19 of FIG. 3.

The variable speed transmission of FIG. 18 includes a first set of gears 158a, 158b, 158c and 158d mounted about and secured rigidly to the motor driven shaft 33, and a second series of gears 159a, 159b, 159c and 159d mounted about and rigidly secured to the countershaft 36, with the gears 159a, b, c and d being in lateral alignment with gears 158a, b, c and d. A carrier 160 is disposed about the motor-driven shaft 33, and contains an inner recess 161 within which the gears 158a, 158b, 158c and 158d are received, with a reduced diameter portion 162 of carrier 160 projecting outwardly through an opening in the side wall of the housing and carrying the speed adjusting knob 12. Carrier 160 carries a third set of gears 164a, 164b, 164c and 164d, which are mounted to the carrier by mounting pins 264 or otherwise for relative rotation about axes 165, 166, 167 and 168 disposed parallel to the axes of shafts 33 and 36 and spaced circularly and evenly about the axis of shaft 33. The gears 164a, 164b, 164c and 164d, besides being offset circularly from one another, are also offset axially relative to one another, so that the gear 164a in a particular rotary setting of carrier 160 is received between and meshes with both of the gears 158a and 159a to form an effective drive therebetween at a predetermined gear ratio dependent upon the sizes of the gears 158a and 159a. Similarly, in another rotary setting of carrier 160, the gear 164b is received between and meshes with both of the gears 158b and 159b to form a drive therebetween at a changed gear ratio dependent upon the sizes of these particular gears. In other rotary settings, the gears 164c and 164d become effective between their corresponding pairs of gears on the shafts 33 and 36, to thus give four different output speeds for the driven shaft 36 for a single speed of shaft 33. As will be understood, the gears 164a, b, c and d remain continuously in engagement with gears 158a, b, c and d.

Carrier 160 can be detented in any of its discussed four speed settings, by reception of a spring-pressed dog element 169 pivoting about an axis 170 within any of four different ratchet-shaped notches 171 formed in the periphery of carrier 160. When dog 169 is received within any of the notches 171, the engagement of the dog with the end shoulder 172 of that notch prevents counter-clockwise rotation of the carrier as viewed in FIG. 2. The direction of rotation of the motor is such as to tend to turn carrier 160 in that counter-clockwise direction as a result of the transmission of power through the gears, and consequently it is unnecessary to restrain clockwise rotation in FIG. 2. In order to reset the speed change mechanism to a new ratio, the knob 163 is turned in a clockwise direction in a manner rotating carrier 160 in that clockwise direction, causing dog 169 to be cammed out of the notch 171 within which it has been received and ultimately be spring-pressed into the next successive notch or any other desired notch for a particular speed setting, in which the dog will again act against the end of the ratchet-shaped notch to prevent counter-clockwise rotation and retain a corresponding one of the gears 164a, b, c or d in engagement with the coacting gear 159a, b, c or d.

In preparing the camera for use, the side door 120 of the camera body may first be opened to receive a film cartridge 11 containing a full lower roll 67 of unexposed film and only enough film on the upper spool 61 for effective attachment to that spool. The cartridge is inserted laterally into compartment 50, and to the position of FIGS. 2 and 3. During such insertion, the arm 106 is held by spring 107 in its FIG. 4 position, in which the connector 97 has its lugs 99 properly aligned with notches 85 of connector 82 for movement into interfitting engagement therewith. This aligned position of the parts is determined by positioning of arm 74 within the cartridge in an upper position due to the absence of film on the upper spool, and is determined by engagement of arm 106 with a stop pin 173 (FIG. 4) carried by the camera body. This stop pin 173 may be mounted to a clamping ring 174 disposed about bearing element 195, with the clamping ring being mounted to turn about the bearing to a set position and being securable in that set rotary position by tightening of a set screw 175 acting to constrict the clamping ring on the bearing structure and prevent its rotation relative thereto.

In order to permit the inner connector 91 of the cartridge assembly to move into properly aligned engagement with connector 98, the film use indicator arm 13 may be manually held in an upper position while the cartridge is inserted into its compartment in the camera case, so that the tongue 100 and recess 92 of FIG. 10 can be in the illustrated aligned positions for movement together. As will be understood, the camming portions 86 and 93 of notches 85 and recess 97 act to take care of any slight inaccuracies in the relative rotary positioning of the parts, to cam the parts rotatively into appropriate settings as the cartridge is moved into its compartment.

After the cartridge has been installed, and with the speed setting knob turned to the position for taking photographs at a desired frequency, and with the shutter mechanism set to an appropriate angular gap width, the camera may be energized at any time by closing the circuit to motor 29, to commence rotation of shaft 36 and through it drive crank element 42, chain 40 and the shutter. Rotation of the crank causes reciprocation of element 108 between the full line and broken line positions of FIG. 4, to oscillate disc 110 rotatively about axis 112. The one-way clutch 111 functions to intermittently turn spool 61 about its axis in a direction winding film on the upper spool and advancing it progressively past the exposure location in alignment with the lens. During the intervals when the intermittently advancing film is stationary, the light-passing gap of shutter assembly 26 moves past the lens to expose the stationary film. The angle through which spool 61 rotates on each reciprocation of part 108 is determined by the radial distance r between axes 112 and 118 (FIG. 4), which progressively increases as the external diameter of the film on the upper spool increases. This automatic adjustment is attained by downward swinging movement of arm 74 as viewed in FIG. 6, causing clockwise swinging movement of arm 106 as viewed in FIG 4, with resultant movement of the roller 113 and its axis 118 and the upper end of part 108 to positions of increased radial spacing from axis 112. The dimensions of the parts are predetermined so that the progressive reduction in angular movement of part 110 is just sufficient to compensate for the increased radius at which the film is being wound onto upper spool 61, and to on each cycle of operation cause a predetermined linear advancement of the film corresponding to or just slightly greater than the vertical height of the frame opening 53, so that there is no overlap of successive frames and no excessive spacing between those frames.

In order to achieve the above discussed result, the dimensions of the parts are preferably determined to satisfy the equation:

$$R_1/R_2 = L_1/L_2$$

where:
- $R_1$ is the radius of the outer layer of film on upper spool 61
- $R_2$ is the distance between axes 118 and 112
- $L_1$ is the length of lever arm 74
- $L_2$ is the length of lever arm 106

The distance the film is moved per stroke is then:

$$2S \times (R_1/R_2) \text{ or } 2S \times (L_1/L_2)$$

where S is the distance between the axis 44 of rotation of crank wheel 42 and the axis of its eccentric crank shaft 43.

While a certain specific embodiment of the present invention has been disclosed as typical, the invention is of course not limited to this particular form, but rather is applicable broadly to all such variations as fall within the scope of the appended claims.

I claim:

1. A camera comprising:
   a camera body for containing a strip of film which advances from a first roll of the film to a second roll past an exposure location;
   lens means for focusing an image on the film at said exposure location;
   shutter means;
   an exposed film spool on which said second roll of film is wound;
   mechanism operable to turn said spool intermittently to successively advance different frames of the film to said exposure location, including a rotatively movable element and an adjustable drive structure for acting against said element at variable distances from its axis to vary the angle through which the spool rotates on each operation; and
   sensing means responsive to changes in the diameter of one of said rolls and controlling adjustment of said drive structure in a relation varying the angle of rotation of said spool on an individual operation in accordance with such changes in diameter.

2. A camera as recited in claim 1, in which said drive structure includes an oscillating drive part acting against said rotatively movable element at distances from its axis varying, under the control of said sensing means, in accordance with the diameter of said one roll.

3. A camera as recited in claim 1, in which said rotatively movable element oscillates rotatively, and which further includes a one-way clutch between said element and said spool to turn the spool intermittently in a predetermined direction in response to oscillations of said element, and in which the drive structure includes a power driven member mounted for essentially reciprocating movement and acting against said rotatively movable element at variable distances from its axis.

4. A camera as recited in claim 3, which includes a structure carried by said power driven member and through which force is applied by said member to said rotatively movable element, and a guideway carried by said element and through which said structure applies said force and by which said structure is guided for adjusting movement radially of said rotatively movable element by said sensing means.

5. A camera comprising:
   a camera body adapted to contain a strip of film which advances from a first roll of the film to a second roll past an exposure location;
   lens means for focusing an image on the film at said exposure location;
   shutter means;
   an exposed film spool on which said second roll of film is wound;
   mechanism operable to turn said spool intermittently to successively advance different frames of the film to said exposure location and which is adjustable to vary the angle through which the spool rotates on each operation; and
   sensing means responsive to changes in the diameter of one of said rolls and controlling adjustment of said mechanism in a relation varying the angle of rotation of said spool on an individual operation in accordance with such changes in diameter, in which said mechanism includes a rotatively oscillating element, a one-way clutch for driving said spool intermittently in a predetermined rotary direction in response to rotary oscillation of said element, a guideway carried by said element and extending generally radially thereof, a reciprocating member having a connector portion acting against said guideway and movable radially therealong, and a rotatively power driven crank connected to said member at a location spaced from the guideway and acting to reciprocate the member and thereby oscillate said element rotatively, there being a control connection between said sensing means and said portion of the drive member acting to shift said portion radially of said element in accordance with changes in the diameter of said one roll.

6. A camera as recited in claim 5, in which said sensing means include a swinging arm including a structure engaging the periphery of said one roll and swinging in accordance with the changes in diameter thereof, a second arm interconnected with said first arm to swing in accordance therewith, and a link between said second arm and said portion of said reciprocating member for actuating said member radially of said rotatively oscillating element in accordance with the change in diameter of said one roll.

7. A camera comprising:
a camera body adapted to contain a strip of film which advances from a first roll of the film to a second roll past an exposure location;
lens means for focusing an image on the film at said exposure location;
shutter means;
an exposed film spool on which said second roll of film is wound;
mechanism operable to turn said spool intermittently to successively advance different frames of the film to said exposure location and which is adjustable to vary the angle through which the spool rotates on each operation;
sensing means responsive to changes in the diameter of one of said rolls and controlling adjustment of said mechanism in a relation varying the angle of rotation of said spool on an individual operation in accordance with such changes in diameter;
a film cartridge case containing said exposed film spool; and
a second spool in said cartridge case for carrying said first roll of film;
said sensing means being contained within said cartridge case to respond to the changes in diameter of said one roll of film;
said mechanism being located at the outside of said cartridge case and being connectable to said sensing means for adjustment thereby when the cartridge case is in said camera body.

8. A camera as recited in claim 7, having said sensing means including an arm mounted in said cartridge case for swinging movement and carrying a structure at an end of the arm engaging the periphery of said one roll of film in a relation causing said arm to swing in accordance with changes in the diameter of said roll; and a second swinging arm in said camera body but at the outside of said cartridge case and which is connected to said first swinging arm for movement in accordance therewith when the cartridge case is in position in the camera body, said second swinging arm being connected to said mechanism to adjust it in accordance with the swinging movement of said arms.

9. A camera as recited in claim 7, further including a first swinging arm in the cartridge case carrying a structure engaging the periphery of said one roll of film to swing in accordance with changes in the diameter thereof;
a second swinging arm in the cartridge case engaging the periphery of one of said rolls;
first connector means for attaching said first swinging arm to said mechanism for adjustment thereof in accordance with swinging movement of said first arm when the cartridge case is in said camera body;
indicator means at the outside of the cartridge case for indicating the amount of film remaining in said case; and
second connector means for attaching said indicator means to said second swinging arm for actuation thereby when the cartridge case is in the camera body.

10. A camera as recited in claim 9, in which said arms swing about a common axis essentially parallel to the axes of said spools, said first connector means including a shaft connected to one of said swinging arms and including an element at the outside of the cartridge case engageable with said shaft for adjusting said mechanism, said second connector means including a second shaft coaxial with said first shaft and engageable with said indicator means when the cartridge case is in the camera body.

11. A camera as recited in claim 10, in which said mechanism includes an element at the outside of said cartridge case rotatively oscillating about the axis of said exposed film spool, a rotary element at the outside of the cartridge case connected to said exposed film spool in driving relation when the cartridge case is in the camera body, a one way clutch between said rotatably oscillating element and said rotary element, a guideway carried by said rotatably oscillating element and extending radially thereof, a connector structure applying force to said guideway and mounted thereby for movement radially of said rotatably oscillating element, a reciprocating member attached to said connector structure, and a motor driven crank for reciprocating said member.

12. A camera as recited in claim 11, including a third swinging arm at the outside of the cartridge case and connected to said first swinging arm when the cartridge case is in the camera body to swing therewith, a link attaching said third swinging arm to said connector structure, and a spring yieldingly urging said third swinging arm in a direction urging said first swinging arm against said one roll of film.

* * * * *